July 17, 1934.  C. E. L. LIPMAN  1,967,035
MOTOR COMPRESSOR UNIT
Filed May 8, 1933  3 Sheets-Sheet 2
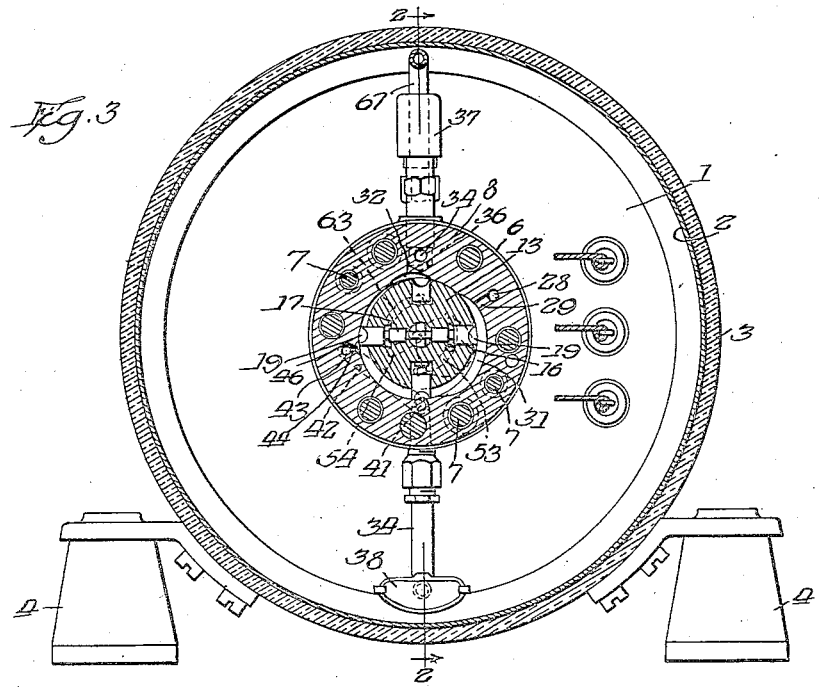
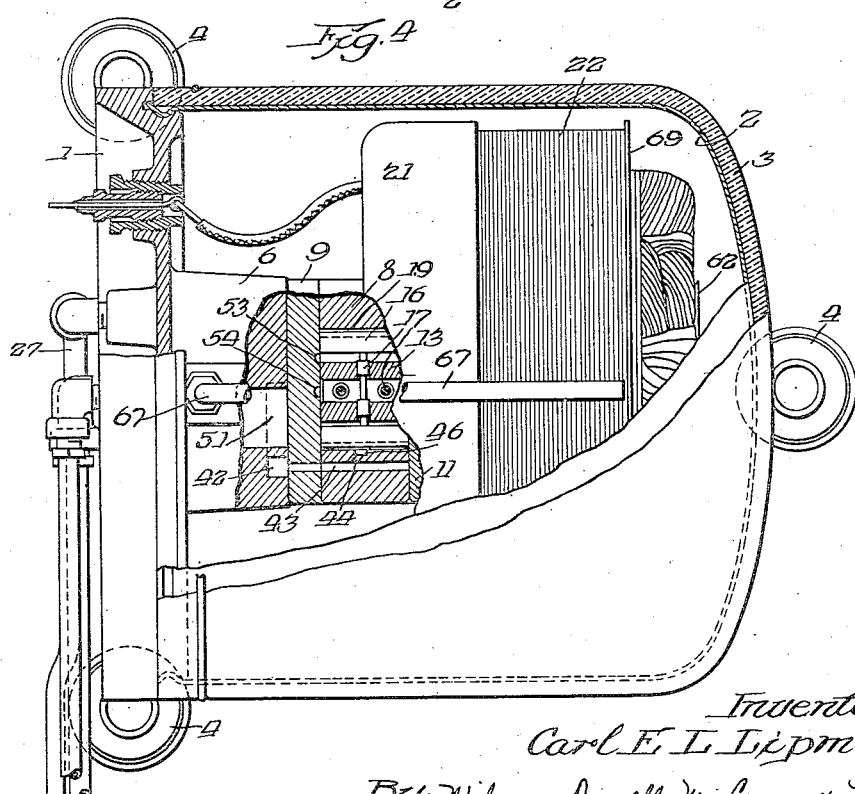
Inventor:
Carl E. L. Lipman.
By Wilson, Dowell, McCanna & Lorch
Attys
Witness:
A. B. Davison.

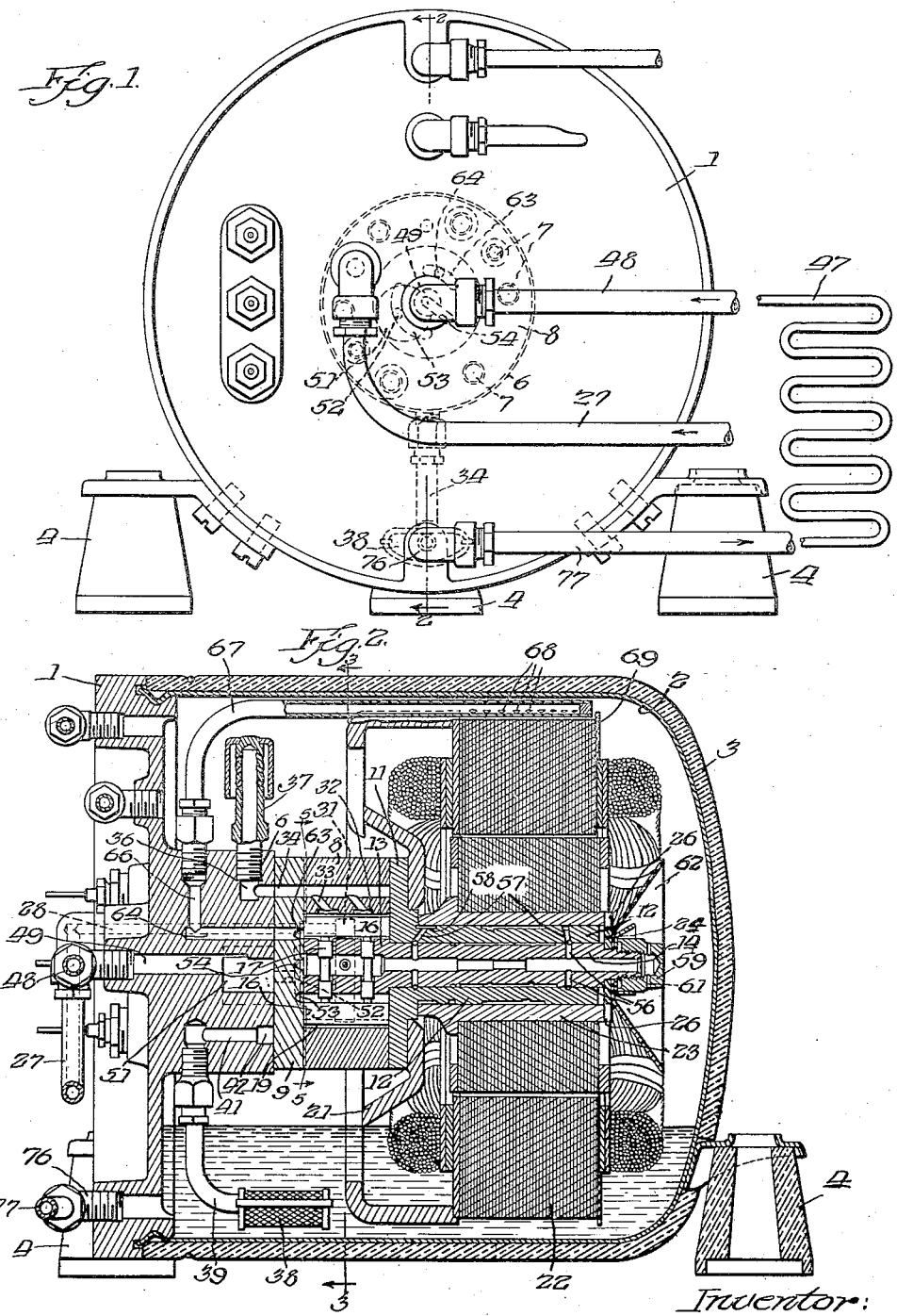

July 17, 1934.    C. E. L. LIPMAN    1,967,035
MOTOR COMPRESSOR UNIT
Filed May 8, 1933    3 Sheets-Sheet 3
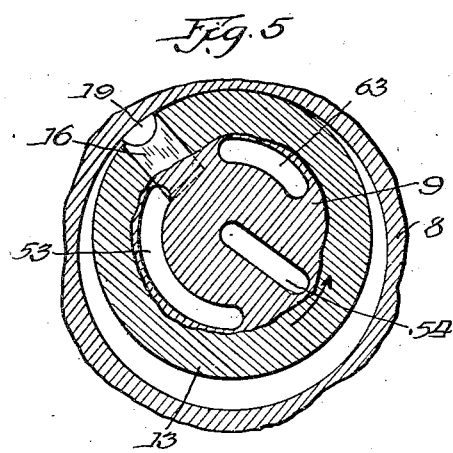
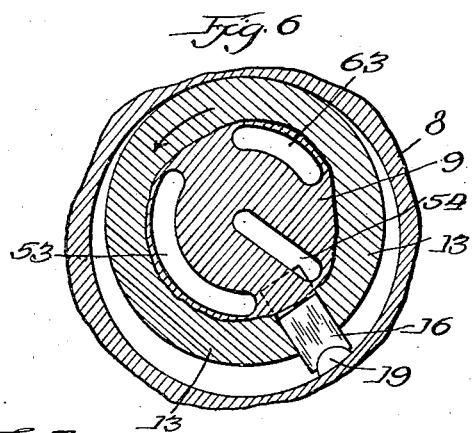
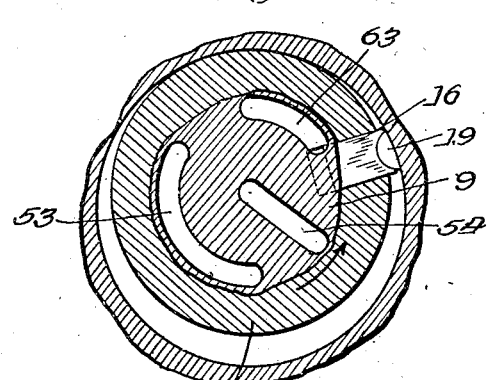
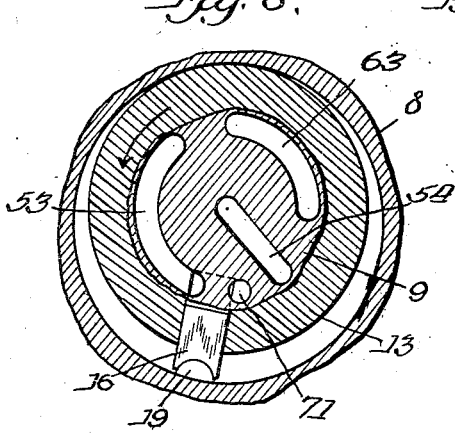
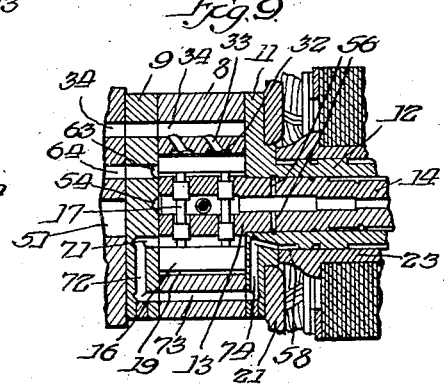
Witness:
R. B. Davison.
Inventor:
Carl E. L. Lipman
By: Wilson, Dowell, McCanna & Forck
Attys.

Patented July 17, 1934

1,967,035

UNITED STATES PATENT OFFICE 1,967,035

MOTOR COMPRESSOR UNIT

Carl E. L. Lipman, Chicago, Ill., assignor to Lipman Patents Corporation, Chicago, Ill., a corporation of Delaware Application May 8, 1933, Serial No. 669,907

3 Claims. (Cl. 230—207)

This invention relates to motor compressor units and more particularly to hermetically sealed units especially suited for mechanical refrigerators, although it will be manifest that the invention is capable of other applications.

Temperature control of hermetically sealed motor compressor units for refrigerating mediums is of extreme importance because the unit is sealed in a casing containing compressed refrigerant which is expansible to a dangerous degree if the temperature of the unit becomes too high. Furthermore the lubricant absorbs some of the refrigerant if the temperature drops too low. The difficulties of providing proper lubrication and maintaining proper temperature conditions in sealed units are increased because the motor and compressor are within the sealed unit and therefore inaccessible for inspection or external lubrication after the unit is sealed and because the driving motor is enclosed with the refrigerant and lubricant in intimate heat transferring contact therewith.

It is the purpose of this invention to provide a hermetically sealed unit having a positive lubricant feed to the bearings thereof, and an independent positive feed for circulating a portion of the lubricant over the motor to cool the same.

It is also an object of this invention to provide the foregoing features in a horizontally disposed unit.

In accordance with this invention I employ a single pump for compressing and circulating the refrigerant, the lubricating oil, and the cooling oil. Preferably I employ a rotary pump and utilize the same blades for compressing the refrigerant and oil, using a separate intake and pumping the discharge for the refrigerant, a single but independent intake for the oil, and a plurality of independent discharge ports or outlets for the oil to one or more of the bearings, and to the cooling oil distributor.

A more comprehensive understanding of the invention, its novel features and resultant advantages may be obtained from the following description given in connection with the drawings in which:

Fig. 1 is an end elevation of a unit constructed in accordance with this invention, Fig. 2 is a longitudinal vertical central section taken approximately on line 2—2 of Figs. 1 and 3, Fig. 3 is a vertical transverse section through the pump taken approximately on line 3—3 of Fig. 2, Fig. 4 is a plan view broken away and partly in section of a complete unit, Figs. 5, 6 and 7 are schematic sections taken approximately on line 5—5 of Fig. 2, illustrating one blade of the pump in various positions of its cycle of operation, Fig. 8 is a similar view of a slightly modified form of pump, and Fig. 9 is a fragmentary sectional view similar to Fig. 2 of the modified form.

Referring now to the drawings in more detail the entire unit is carried by an end plate or base 1 to which is hermetically sealed a case 2, the latter being covered by an insulating cover 3 if desired. The case 2 closed by the end plate hermetically encloses a quantity of compressible fluid, such as a refrigerant, a quantity of lubricant and the motor compressor unit, all in heat transferring contact. The unit is supported upon three resilient feet 4 secured to the end plate and casing.

Projecting from the center of one side of the end plate is a circular extension 6 to which is secured by cap screws 7 a cylindrical pump and compressor housing 8 closed upon one end by a cap or plate 9 disposed between extension 6 and housing 8, and upon the other end by a flange 11 of a horizontal fixed hollow stud 12. The pump housing is bored to provide a cylindrical rotor chamber within which is eccentrically mounted the rotor 13 of the compressor. The rotor is carried by shaft 14 extending through and journalled within hollow stud 12. The rotor is provided with radial slots within which are mounted pump and compressor blades or vanes 16 maintained in spaced relation by rigid pins 17 and provided with outer sealing members 19.

Secured to flange 11 is a spider 21 which carries the stator 22 of the electric motor for driving the pump. The rotor of the motor is secured to a sleeve 23 journalled about the exterior of the hollow stud 12. A driving disc 24 engaging the squared end of shaft 14 and having fingers 26 which engage slots in sleeve 23 connects shaft 14 to sleeve 23 so that the motor rotor drives the compressor rotor.

The fluid to be compressed, such as a refrigerant, is introduced into the chamber between the rotor and the pump housing, provided by the eccentric mounting of the rotor relatively to the housing, by a tube or duct 27 which connects with a bore 28 extending through the end plate 6, cap 9, pump housing 8, and terminating in a lateral duct 29 (Fig. 3). Duct 29 extends into an intake port 31 (Figs. 2 and 3) communicating with the chamber between the rotor and housing. The gas is compressed by rotation of the blades which rotate counter clockwise as viewed in Figs.

1, 5, 6, 7 and 8, and is discharged through an outlet port 32 to the inclined radial ducts 33 in the pump housing which communicate with a transverse duct 34 extending through the pump housing, through the cap, and into the extension 6 where it communicates with a duct 36. Duct 36 leads to the interior of the casing and is threaded to receive a muffling device 37 extending upwardly into the interior of the sealed casing.

Seal oil for lubricating and sealing the blades is taken from the oil sump provided in the bottom of the casing through a strainer 38 and pipe 39 connected to a bore 41 in extension 6. Bore 41 communicates with an inclined groove 42 (Figs. 2 and 4) which communicates at one extremity with a bore 43 extending through cap 9, housing 8 and which communicates with a radial duct 44. Duct 44 terminates in a port 46 which enters the compression chamber between the rotor and housing at a point adjacent the end of the compression stroke portion of the revolution of the rotor. The oil in the sump being under pressure will be forced into this chamber.

The compressor also constitutes a pump for the lubricating and cooling oil. For this purpose the inner ends of the blades are utilized. Cooling and lubricating oil is drawn in from the cooler 47 through pipe 48 which connects to a central bore 49 in the end plate. Bore 49 terminates in an enlarged well 51 formed in the inner face of the extension 6. This well communicates through a lateral duct 52 extending through cap 9 with an arcuate groove 53 formed in the inner face of cap 9. This groove constitutes an oil inlet and communicates with the slots between the inner ends of blades 16 and the rotor 13. The beginning of the intake stroke or portion of the rotor revolution is illustrated in Fig. 5. As the blades in their rotative travel move outwardly they successively apply suction to the groove or passage 53, causing an inflow of oil into the slots behind the blades.

As the rotor revolves and the blades are forced inwardly by contact of their outer ends with the pump housing, a portion of the oil between the inner ends of the blades and the slots is forced into a radial discharge groove or port 54 formed in the inner face of cap 9, which groove extends inwardly toward the center of the shaft. This discharge position is shown at Fig. 6. The radial groove 54 communicates with a central bore extending longitudinally through shaft 14.

The shaft is further provided with radial passages 56 communicating with oil grooves surrounding the outer surface of shaft. Stud 12 is also provided with radial passages 57 adjacent each end thereof which communicate with oil grooves 58 formed in the outer surface of the stud and with radial grooves 56. The bearing surfaces between the stud and the center shaft and the stud and the outer sleeve are therefore thoroughly lubricated, the lubricating oil is being circulated through the lubricating grooves in the bearing surface and out through the end of the shaft. Shaft 14 carries a nut 59 having lateral passages 61 which deflect the oil outwardly. To further deflect the oil and prevent it from entering the air gap between the rotor and stator of the motor there is provided a dish shaped deflector or spinner 62, which directs the oil flowing outwardly through ports 61 in a direction away from the air gap.

As the pump blades are forced still further into their radial slots, the latter come into communication with an arcuate discharge groove or port 63 formed in the inner face of cap 9. This discharge position is illustrated in Fig. 7. Arcuate slot 63 communicates with a bore 64 extending through cap 9 and into extension 6, terminating therein in a vertical bore 66 to which is connected a tube 67. Tube 67 extends to the upper portion of the casing and over the stator above the motor over which it distributes the oil through apertures 68. Oil is prevented from running over the end of the stator and getting into the air gap by means of a baffle plate 69 secured to the outer end of the stator projecting upwardly above the stator.

In Figs. 8 and 9 there is illustrated a slightly modified form of this invention in which an independent discharge is provided for delivering lubricating oil to certain of the bearing surfaces. With this form of the invention an intermediate discharge port 71 is provided in cap 9 which terminates in the inner surface thereof at a point just prior in the cycle to radial groove 54. Port 71 communicates with a lateral bore 72 which leads to a horizontal bore 73 which extends into a bore 74 in the flange 11 of the stud, the latter bore communicating with oil grooves 58 in the outer surface of stud or standard 12.

The radial communicating passages 57 are omitted so that the bearing surfaces between the sleeve and the outer surface of the studs are supplied with lubricant through an independent discharge and the lubricant grooves between the outer surface of the shaft and the inner surface of the studs are fed through an independent discharge.

The oil sump in the bottom of the unit is connected to the oil cooler by means of a connection 76 and pipe 77. Lubricant is circulated through the cooler because of the pressure upon the lubricant in the sealed casing and because of the suction created in the lubricant intake to the pump.

From the foregoing description it will be apparant that there has been provided a single compact horizontal unit in which a single pump is utilized to circulate both the refrigerant and the lubricant. Furthermore, lubricant is taken into the pump through a single suction or intake port and discharged through independent discharge ports, one leading to the distributing pipe for the cooling oil and another to certain of the bearings in the motor compressor drive and in the modified form another to certain other bearings. These multiple discharge ports insure thorough and positive lubricating oil to the moving parts and positive circulation of cooling oil over the stator.

It will be obvious to those skilled in the art that many variations may be made in the details of construction without departing from the spirit and scope of this invention as defined in the appended claims.

I claim:

1. A motor compressor unit comprising a cylindrical horizontally disposed hermetically sealed casing, one end wall of which is provided with an inwardly extending support, a compressor housing carried by said support and having a hollow bearing stud projecting horizontally therefrom, a compresseor rotor within said housing provided with radially disposed blade slots and having a shaft journalled in said stud, radially disposed blades slidably mounted in said slots, an electric motor having its rotor journalled on said stud and operatively connected to said shaft, said support being provided with passages through which fluid to be compressed is delivered from outside said case to the working chamber of said compressor and from said chamber to the interior of said case, the base plate of said compressor housing disposed against said support being provided with a plurality of elongated ports with which said blade slots successively register during rotation of said rotor, one of said ports being an oil inlet port to the chamber and the others being oil discharge ports therefrom, means for conducting oil discharged through one of said ports to a point in said case directly over the stator of said motor and delivering said oil onto said stator to cool the same, and means for conducting the oil discharged from another of said ports to the motor and compressor bearings to lubricate the same.

2. A motor compressor unit comprising a cylindrical horizontally disposed hermetically sealed case, an electric motor and a rotary compressor horizontally disposed within said case supported from one end wall thereof and operatively connected so that said motor drives said compressor, said compressor including a housing one end wall of which is provided with inlet and outlet ports for the admission and discharge of fluid to be compressed and with an inlet port and a plurality of outlet ports for oil to be pumped and a rotor within said housing provided with radially disposed slots and having a blade reciprocably mounted in each slot, means for delivering oil from one of said discharge ports to the motor and compressor bearings, means for delivering oil from another of said discharge ports to a point above the motor stator and delivering the same directly on to said stator, and means for preventing the oil so delivered from entering the air gap of said motor.

3. A motor compressor unit comprising a cylindrical horizontally disposed hermetically sealed case, a horizontally aligned motor and compressor supported from one end wall of said case, said compressor comprising a housing, a rotor therein provided with radial slots and blades reciprocably mounted in said slots, a hollow supporting stud projecting from the inner end wall of said housing, a shaft fixedly associated with said compressor rotor and journalled in said stud, a sleeve surrounding and journalled upon said stud and carrying the motor rotor, a flexible driving connection between said shaft and said motor rotor at the end of said stud, a spider carried by the inner end wall of said compressor by which the motor stator is supported, the base plate of said compressor being provided with a plurality of ports communicating with the working chamber of the compressor, two of said ports serving as supply and exhaust ports to and from the chamber for the fluid to be compressed, another serving as a supply port for oil to said chamber and others arranged in spaced relation serving as discharge ports for said oil, connections for delivering oil from one of said discharge ports to the motor compressor bearings, and a connection for delivering oil from another discharge port to the top of the motor stator so that said oil may flow down onto the stator to cool the same.

CARL E. L. LIPMAN.